United States Patent
Grossman et al.

(10) Patent No.: US 10,779,041 B2
(45) Date of Patent: Sep. 15, 2020

(54) SYSTEM AND METHOD FOR DISPLAYING SCREENSHOT-PROOF CONTENT

(71) Applicant: Confide, Inc., New York, NY (US)

(72) Inventors: Jeffrey Grossman, New York, NY (US); Chi-Hsiu Rich Hong, New York, NY (US); Jonathan Brod, New York, NY (US)

(73) Assignee: Confide, Inc., New York, NY (US)

( * ) Notice: Subject to any disclaimer, the term of this patent is extended or adjusted under 35 U.S.C. 154(b) by 0 days.

(21) Appl. No.: 16/211,351

(22) Filed: Dec. 6, 2018

(65) Prior Publication Data
US 2019/0182549 A1   Jun. 13, 2019

Related U.S. Application Data

(60) Provisional application No. 62/596,456, filed on Dec. 8, 2017.

(51) Int. Cl.
*H04N 21/4627* (2011.01)
*H04L 29/06* (2006.01)
*H04N 21/262* (2011.01)
*H04L 29/08* (2006.01)
*H04N 21/436* (2011.01)
*H04N 21/431* (2011.01)

(52) U.S. Cl.
CPC ....... *H04N 21/4627* (2013.01); *H04L 65/604* (2013.01); *H04L 67/02* (2013.01); *H04L 67/42* (2013.01); *H04N 21/26258* (2013.01); *H04N 21/436* (2013.01); *H04N 21/4312* (2013.01)

(58) Field of Classification Search
CPC .................................................. H04N 21/4627
See application file for complete search history.

(56) References Cited

U.S. PATENT DOCUMENTS

| 8,954,605 | B1 | 2/2015 | Hect |
| 9,648,001 | B2 | 5/2017 | Lerman et al. |
| 9,712,512 | B2 | 7/2017 | Lerman et al. |
| 2006/0161971 | A1 | 7/2006 | Bleahen |
| 2006/0195902 | A1* | 8/2006 | King ................. G06F 21/10 726/21 |
| 2008/0226136 | A1 | 9/2008 | Takaku et al. |
| 2009/0249077 | A1 | 10/2009 | Gargaro et al. |
| 2012/0210126 | A1 | 8/2012 | Johnson et al. |
| 2013/0283393 | A1* | 10/2013 | Hierro ............... G06F 21/10 726/27 |

(Continued)

OTHER PUBLICATIONS

Kleinman, Alexis, "This App Actually Lets You Send Screenshot-Proof Messages and Photos", HuffPost, Feb. 4 2015, https://www.huffingtonpost.com/2015/02/04/confide-app_n_6613244.html, 4 pages.

*Primary Examiner* — Michael H Hong
(74) *Attorney, Agent, or Firm* — Lowenstein Sandler LLP (57) ABSTRACT

Described herein are systems and methods for displaying screenshot-proof content. In one embodiment, a method of protecting a digital content from capture by a screen capture operation of a user device comprises: receiving, by the user device, the digital content; converting a format of the digital content into a content-protected format; streaming the digital content from a local content server implemented on the user device to a local content client implemented on the user device; and causing the user device to display the digital content.

20 Claims, 7 Drawing Sheets

(56) References Cited

U.S. PATENT DOCUMENTS

2015/0100451 A1* 4/2015 Ree .................... G06Q 30/0621
705/26.5
2015/0371613 A1* 12/2015 Patel ....................... G06F 21/10
345/549

* cited by examiner

SYSTEM AND METHOD FOR DISPLAYING SCREENSHOT-PROOF CONTENT

CROSS-REFERENCE TO RELATED APPLICATION

This application claims the benefit of priority of U.S. Provisional Application No. 62/596,456, filed on Dec. 8, 2017, the disclosure of which is hereby incorporated by reference herein in its entirety.

TECHNICAL FIELD

The present disclosure relates to displaying digital content on electronic devices, and in particular to systems and methods that provide for screenshot-proof display of content.

BACKGROUND

With the convenience afforded by increased connectivity of electronic devices have come ever more prevalent threats to information security. In some circumstances, it is desirable to prevent a user of an electronic device from being able to capture screenshots of sensitive or protected content displayed in an application.

Although methods for preventing sensitive content from being captured in a screenshot are available, the conventional methods have a number of shortcomings on certain platforms. To use Apple's iOS as an example, available methods for screenshot-proofing content on iOS are often limited to use in video streaming applications. As one example, Apple offers content protection for HTTP Live Streaming (HLS) with its FairPlay Streaming technologies. However, HLS is specifically designed for application developers to stream video from a server to a user device (e.g., an iPhone). There is no flag, application program interface (API), or any other setting that developers can specify to have any other types of content marked as "content protected" to provide screenshot-proof functionality.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Described herein are embodiments for displaying screenshot-proof content. These embodiments, as detailed in the description that follows, allow for display of screenshot-proof video content without requiring that such video content is streamed from a remote server. Display of screenshot-proof local video content can be desirable, for example, with an end-to-end messaging application where only a local user device will have access to an unencrypted video for display, and thus a content server is unable to stream the video to a user device. This solution, as detailed in the disclosure that follows, may also be extended for applications comprising content such as text and images (e.g., documents, messages, photos, etc.).

Certain embodiments of the present disclosure provide a process flow that allows for an application run on a user device to take arbitrary content (e.g., text, images, non-digital rights managed (DRM) video, etc.) and eventually run it through a DRM video playback process (e.g., called FairPlay Streaming on the iOS operating system), resulting in (1) video content displayed on screen, and (2) the operating system treating that video content as screenshot-proof. These embodiments are advantageous as they allow for applications to mark certain content to not be included in screenshots without having access to the screenshot generation process and in the failure of the operating system to more explicit, easier to use, screenshot-proof functionality. These embodiments are also advantageous as they can be applied arbitrarily to other types of content, such as images and text data.

An exemplary use is as follows: (1) video content is obtained by the application and screenshot-proof display is configured (as described in greater detail below); (2) the user device displays a static frame of the video content or begins to play the video content; (3) the user attempts to capture a screenshot of the video content; and (4) the screenshot is captured but is absent of any of the video content.

Exemplary steps for configuring the video content for screenshot-proof display are as follows: (1) the video content is encoded into a content-protected format (e.g., a format compatible with FairPlay Streaming); (2) the user device runs a local content server to host and serve the video content; (3) a video playlist is created, which specifies that content protection is to be used for the video content; (4) the video playlist is provided to the user device by the local content server, which initializes the playback process; (5) the video content is retrieved from the local content server; and (6) screenshot-proof display of a frame of the video or playback of the video begins.

As used herein, the terms "screenshot-proof," "screenshot-protected," and the like refer to content that, when presented for display by a user device, cannot be captured by a screenshot operation performed by the user device.

In the description that follows, reference is made to an iOS operating system environment for purposes of illustrating an implementation of the embodiments described herein. It is to be understood that the embodiments described herein are not limited to use in any one particular operating system and that changes may be made to the disclosed implementation without departing from the spirit and scope of the disclosure. Although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Figure 1:
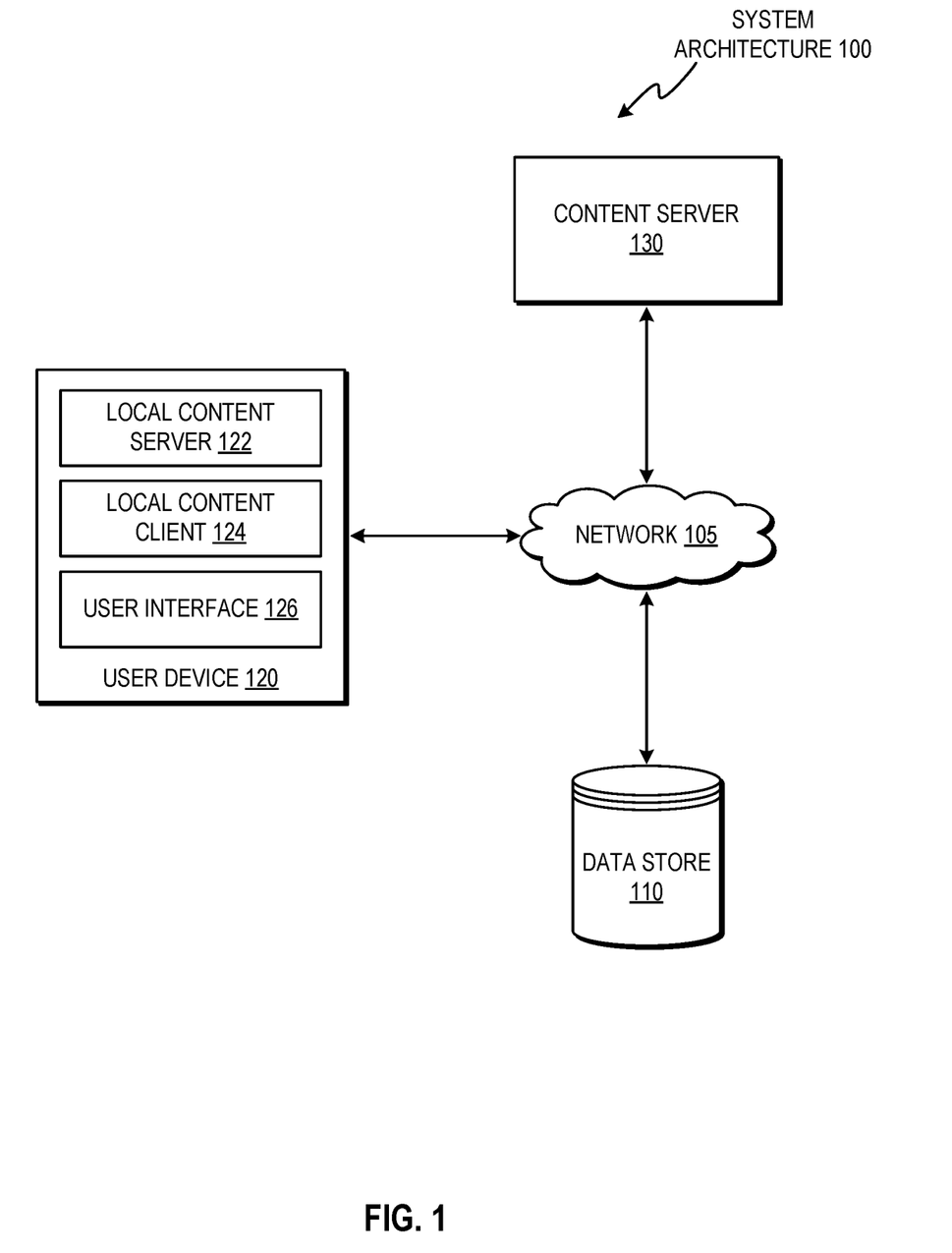
FIG. 1 illustrates an exemplary system architecture in accordance with an embodiment of the present disclosure.

Exemplary implementations of the embodiments described herein are now described. FIG. 1 illustrates an exemplary system architecture 100, in accordance with an embodiment of the present disclosure. The system architecture 100 includes a data store 110, a user device 120, and a content server 130, with each device of the system architecture 100 being communicatively coupled via a network 105. One or more of the devices of the system architecture 100 may be implemented using a generalized computer system 700, described below with respect to FIG. 7. The devices of the system architecture 100 are merely illustrative, and it is to be understood that additional data stores, user devices, content servers, and networks may be present.

In one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as stand-alone networks or in cooperation with each other. The network 105 may utilize one or more protocols of one or more devices to which they are communicatively coupled. The network 105 may translate to or from other protocols to one or more protocols of network devices.

In one embodiment, the data store 110 may include one or more of a short-term memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers). In some embodiments, the data store 110 may be cloud-based. One or more of the devices of system architecture 100 may utilize their own storage and/or the data store 110 to store public and private data, and the data store 110 may be configured to provide secure storage for private data. In some embodiments, the data store 110 may be used for data back-up or archival purposes.

The user device 120 may include a computing device such as a personal computer (PC), laptop, mobile phone, smart phone, tablet computer, netbook computer, etc. User device 120 may also be referred to as a "client device" or "mobile device." An individual user may be associated with (e.g., own and/or operate) the user device 120. The user device 120 may also be owned and utilized by different users at different locations. As used herein, a "user" may be represented as a single individual. However, other embodiments of the present disclosure encompass a "user" being an entity controlled by a set of users and/or an automated source. For example, a set of individual users federated as a community in a company or government organization may be considered a "user."

The user device 120 may utilize one or more local data stores, which may be internal or external devices, and may include one or more of a short-term memory (e.g., random access memory), a cache, a drive (e.g., a hard drive), a flash drive, a database system, or another type of component or device capable of storing data. The local data stores may also include multiple storage components (e.g., multiple drives or multiple databases) that may also span multiple computing devices (e.g., multiple server computers). In some embodiments, the local data stores may be used for data back-up or archival purposes.

The user device 120 may implement a local content server 122, which may receive and manage digital content that is to be screenshot-protected. The local content servers 122 may be, for example, an HTTP server implemented locally on the user device 120. The user device 120 may further implement a local content client 124, which may be used to access and present digital content to the user. Data may be transmitted (e.g., locally streamed) between the local content server 122 and the local content client 124. In some embodiments, the local data store of the user device 120 may be partitioned between the local content server 122 and the local content client 124 to allow digital content to be stored and maintained separately by the local content server 1220 and the local content client 124.

In one embodiment, a single user device may implement the local content server and local content client. In another embodiment, multiple user devices may distribute the functionality of a local content server and local content client. For example, the user device 120 may implement a local content client 124, and may utilize a separate device that implements the local content server 122 and is locally accessible (e.g., via a wired or wireless network) to the user device 120.

Figure 5:
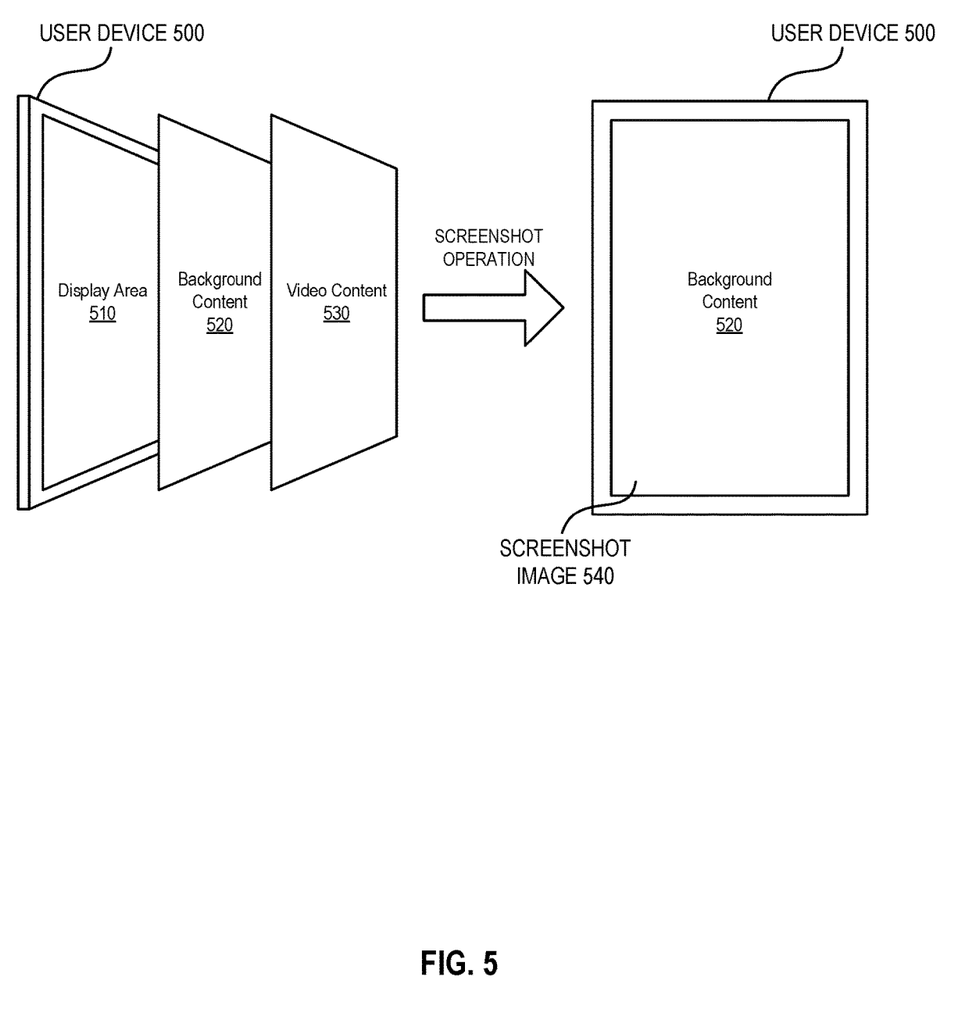
FIG. 5 illustrates the effect of performing a screenshot operation on screenshot-proof video content in accordance with an embodiment of the present disclosure.
Figure 6:
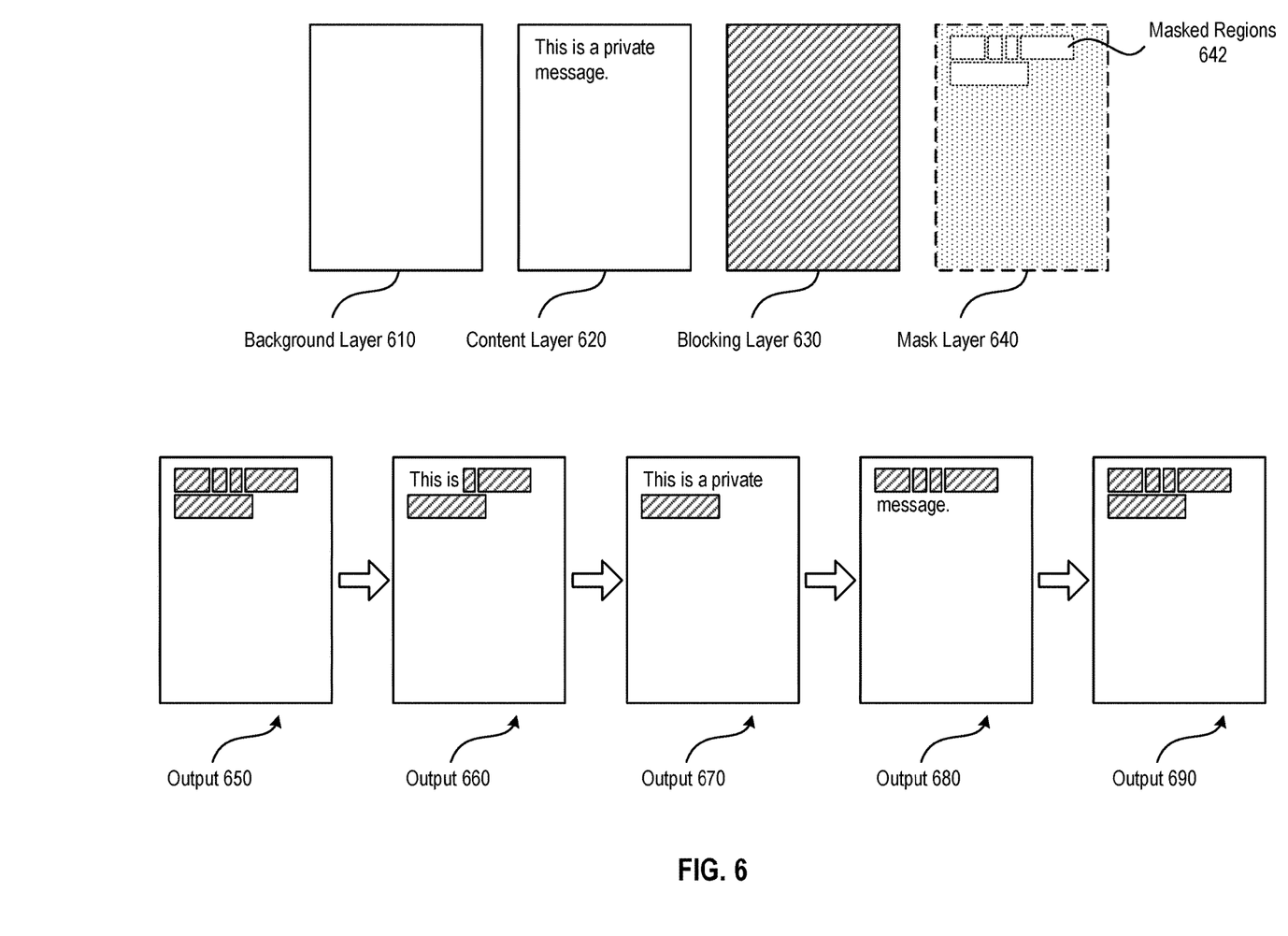
FIG. 6 illustrates an exemplary messaging application in accordance with an embodiment of the present disclosure.

The user device 120 may implement a user interface 126, which may allow the user device to send/receive information to/from other user devices, the data store 110, and the content server 130. The user interface 126 may be a graphical user interface (GUI). For example, the user interface 126 may be a web browser interface that can access, retrieve, present, and/or navigate content (e.g., web pages such as Hyper Text Markup Language (HTML) pages) provided by the content server 130. In one embodiment, the user interface 126 may be a standalone application (e.g., a mobile "app," etc.), that enables a user to use the user device 120 to send/receive information to/from other user devices, the data store 110, and the content server 130. In some embodiments, the user interface 126 may be configured such that digital content stored/maintained by the local content server 122 is not accessible or presentable, but may be accessed or presented for display once such content is transmitted (e.g., locally streamed) from the local content server 122 to the local content client 124. FIGS. 5 and 6 provide examples of user interfaces in accordance with the embodiments described herein, and are discussed in greater detail below.

In one embodiment, the content server 130 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components from which digital contents may be retrieved. In some embodiments, the content server 130 may be a server utilized by any of the user device 120 to retrieve/access content or information pertaining to content. In some embodiments, additional content servers may be present.

In some embodiments, the content server 130 may serve as a source of digital content that can be provided to any of the devices of the system architecture 100. The content server 130 may host various types of digital content, including, but not limited to, webpages, email content, images, audio content, and video content. In some embodiments, the content server 130 may specialize in particular types of content (e.g., a video hosting server, an email server, etc.). In some embodiments, the content server 130 may host shared content, public content, private content (e.g., content restricted to use by a single user or a group of users), commercially distributable content, etc.

Although each of the data store 110, the user device 120, and the content server 130 are depicted in FIG. 1 as single, disparate components, these components may be implemented together in a single device or networked in various combinations of multiple different devices that operate together. In some embodiments, some or all of the functionality of the content server 130 may be performed by the user device 120, or other devices that are under control of the content server 130.

Figure 2:
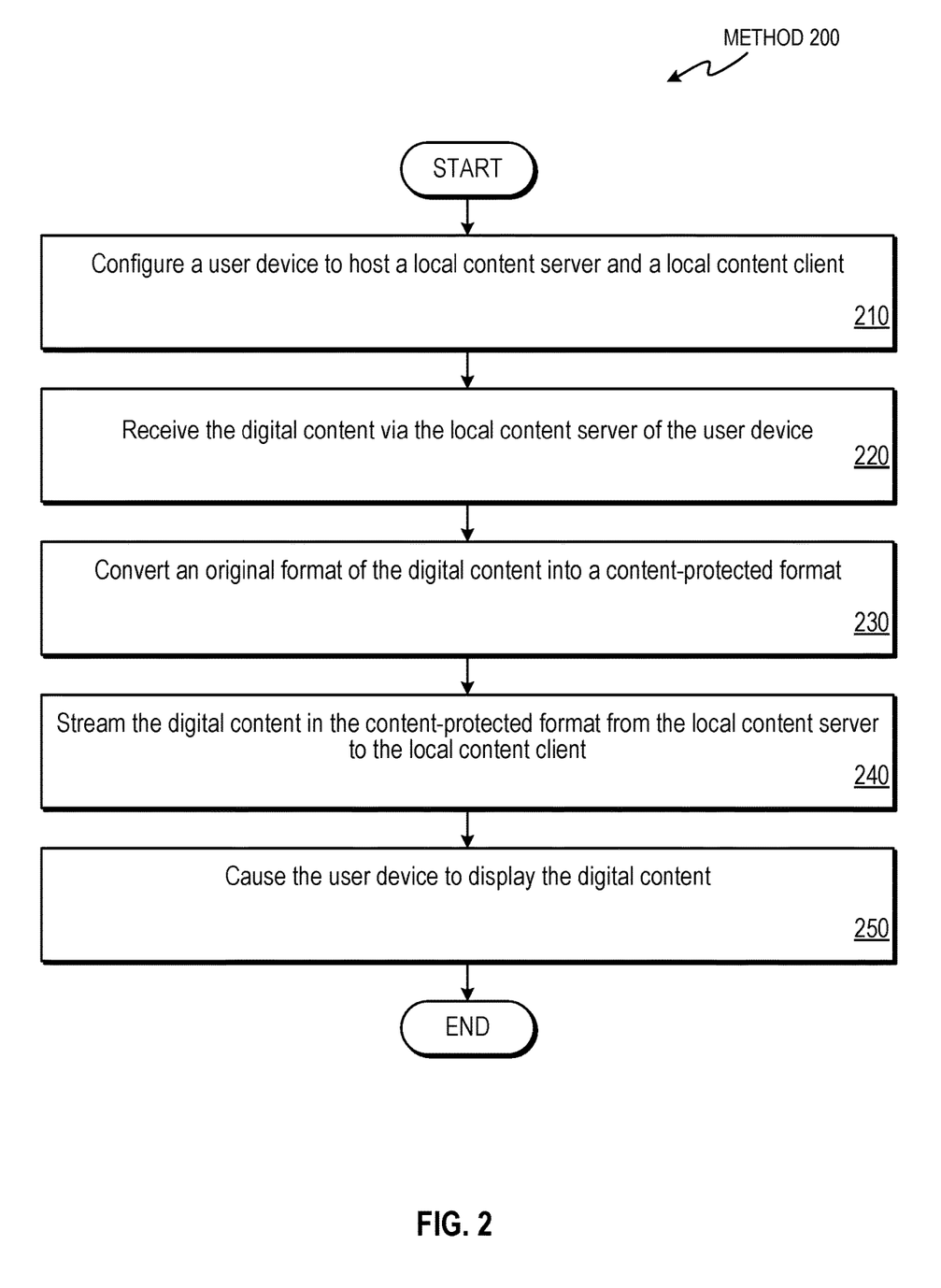
FIG. 2 is a flow diagram illustrating a method of protecting digital content displayed on a user device in accordance with an embodiment of the present disclosure.
Figure 3:
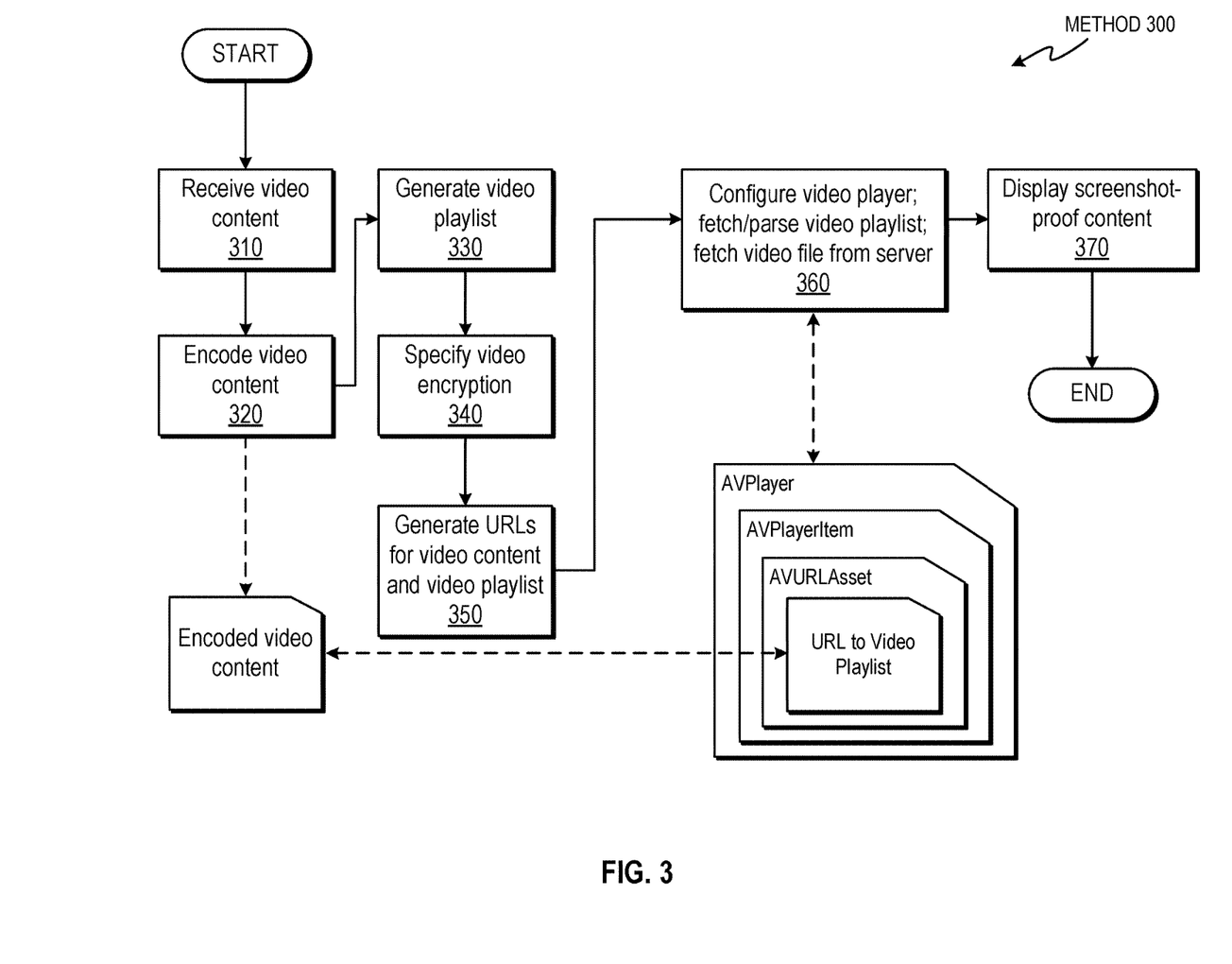
FIG. 3 is a flow diagram illustrating a method of configuring screenshot-proof display in accordance with an embodiment of the present disclosure.
Figure 4:
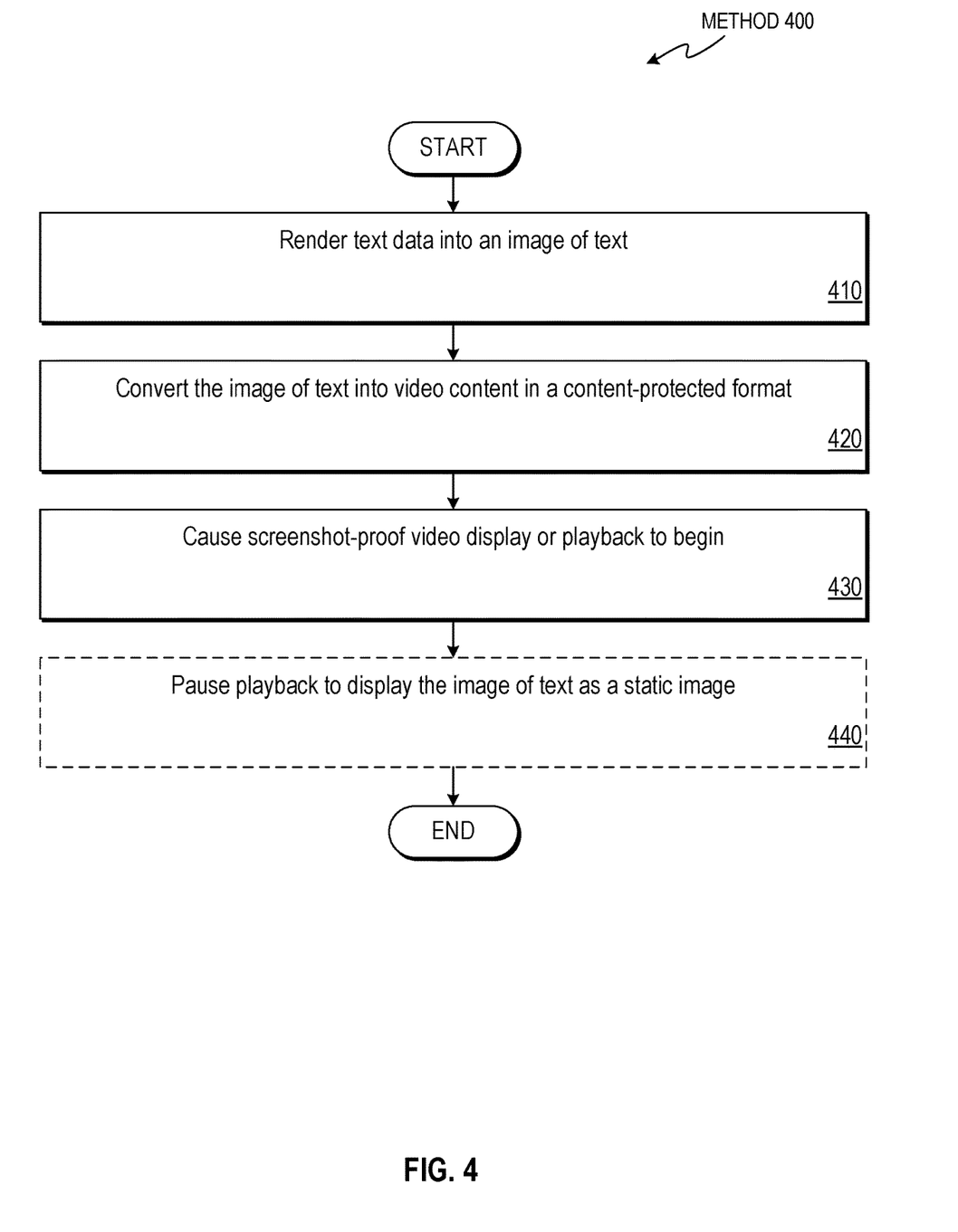
FIG. 4 is a flow diagram illustrating a method of screenshot-proof display of text data in accordance with an embodiment of the present disclosure.

FIGS. 2, 3, and 4 are flow diagrams illustrating methods 200, 300, and 400 respectively, representative of embodiments of the present disclosure. The methods 200, 300, and 400 may be performed by processing logic that includes hardware (e.g., circuitry, dedicated logic, programmable logic, microcode, etc.), software (e.g., instructions run on a processing device to perform hardware simulation), or a combination thereof. In some embodiments, the methods 200, 300, and 400 may be performed by a processing device executing the user device 120 described above with respect to FIG. 1.

Referring to FIG. 2, the method 200 begins at block 210 a user device (e.g., of the user device 120) is configured (e.g., by a processing device of the user device 120) to host a local content server (e.g., the local content server 122) and a local content client (e.g., the local content client 124). In some embodiments, the user device is configured based on software received from, for example, the content server 130 via the network 105 and executed by the user device (e.g., for example, a messaging app that provides screenshot-proof functionality).

In one embodiment, the user device is configured to run an iOS operating system. In other embodiments, the user device is configured to run other operating systems (e.g., Android). In one embodiment, the local content server is an HTTP server.

At block 220, the user device receives digital content. In one embodiment, the digital content is received from a content server (e.g., the content server 130), and stored/maintained by the local content server. For example, the digital content may have been transmitted to the user device by another user device, where the content server (or another server) acts as an intermediary between the user devices. In another embodiment, the digital content is received directly from the other user device (e.g., via a local network or wireless connection). In another embodiment, the digital content is generated locally by the user device. In one embodiment, the digital content is stored in storage that is accessible to the local content server but is inaccessible to the local content client. In some embodiments, the digital content comprises video content, image data, text data, or combinations thereof.

At block 230, an original format of the digital content (i.e., a format of the digital content upon receipt by the user device) is converted into a content-protected format. In one embodiment, the content-protected format is a format that is compatible with the FairPlay Streaming protocol.

In embodiments for which the digital content comprises image data or text data, converting the original format of the digital content into the content-protected format may further include converting the image data or text data into video content. In some embodiments, converting an image into video content comprises generating video content by rendering the image data as one or more frames of the video content. Conversion of text data into video content is described in greater detail below with respect to FIG. 4.

At block 240, the local content server streams the digital content in the content-protected format to the local content client. In one embodiment, the local content server transmits the video playlist to the local content client. The video playlist may include a URL that directs the local content client to the video content of the local content server to enable streaming of the video content in the content-protected format. In one embodiment, the video playlist flags the video content as being content protected.

At block 250, the local content client causes the user device to display the digital content. The digital content is protected from a screen capture operation executed on the user device based on the content-protected format of the digital content. For example, if the user device receives a command (e.g., a user input) to execute a screen capture while the digital content is displayed by the user device, the digital content will be absent from the screen capture image. If the display at the time of screen capture includes the digital content in a layer overlaid on other content, the screen capture image may include the content that is directly below the digital content layer. This embodiment is discussed in more detail below with regard to FIG. 5. In other embodiments, the screenshot operation may be disabled entirely or may fail to capture anything displayed on the screen (including underlying content), for example, in embodiments for which the user device utilizes an operating system that implements screenshot protection in one or more of these ways.

FIG. 3 is a flow diagram illustrating a method 300 of configuring screenshot-proof display in accordance with an embodiment of the present disclosure. The method 300 is discussed within the context of a user device running the iOS operating system, though it is to be understood that this is an exemplary embodiment, as other operating systems and protocols are compatible with the embodiments of the present disclosure.

At block 310, the local content server 122 receives video content for which screenshot protection is desired. For example, the video content may be received from an email or a messaging app. The video content may also be obtained by recording a video on the user device 120, selecting a preexisting video from a photo/video library of the user device 120 or other device, or other suitable methods of obtaining video content.

At block 320, encoded video content is generated (indicated by the dashed arrow) by converting the video content into a format that is compatible with the FairPlay Streaming protocol. Suitable formats may include, for example, the "MPEG-2 Transport Streams" or "Fragmented MPEG-4" formats. In one embodiment, an HTTP web server is configured to run locally on the user device, which is used to host and stream the video content within the user device itself.

In some embodiments, various security precautions may be implemented by the local content server, such as: (1) denying requests originating from anywhere other than the current user device to prevent a malicious actor from attempting to access the video from an outside device; (2) hosting distinct video content at separate randomly generated paths to render it highly unlikely that a malicious local actor would be able to guess the path to the video content during the short duration that the local content server is running; (3) blocking or rate limiting incoming connections to the local content server if one or more bad attempts is made; and (4) shutting down the local content server entirely if a threshold number of bad attempts are made (which is unlikely to occur under normal usage without the presence of bad actors).

The iOS operating system utilizes App Transport Security, which requires the use of HTTPS for network requests. To accommodate this requirement in embodiments in which the local content server is an HTTP server, the NSAllowsLocalNetworking flag is set to YES in the associated Info.plist file.

At block 330, a video playlist specifying the video content is generated. The video playlist may be generated in the M3U/M3U8 standard. This standard includes information such as the playlist type, version, and video duration in seconds.

At block 340, the video encryption is specified. The M3U/M3U8 standard also includes a video encryption tag (EXT-X-KEY) that specifies how the encryption may be decrypted. The encryption method (e.g., SAMPLE-AES), a uniform resource identifier (URI) for the encryption key, and an initialization vector may also be specified. In some embodiments, the video content is not encrypted.

At block 350, URLs for the encoded video content and video playlist are generated. The URL for the video content points to the encoded video content that is to be served from the local content server running on the user device. The URL for the video playlist points to the generated video playlist. The URL for the video playlist passed to an AVURLAsset, which is provided to AVPlayerItem and then AVPlayer, which are part of the AVFoundation framework on iOS that supports video playback. An AVAssetResourceLoaderDelegate is generated, which is used to serve data (e.g., the video playlist) that is requested by an application run by the user device.

At block 360. In one embodiment, the local content client configures the video player and requests the video playlist from the local content server. When the video playlist is requested, AVAssetResourceLoaderDelegate manages the loading of the video playlist and returns its contents to the requesting application. In some embodiments, the local content server may manage the loading of the video playlist. The local content client parses the video playlist and determines from the video playlist that the associated video content is marked for content protection (and encryption in some embodiments). The local content client obtains the URL of the encoded video content and then fetches the encoded video content form the local content server.

At block 370, screenshot-proof content is displayed. In some embodiments, playback of the encoded video content begins, and may be presented for display in a graphical user interface of the user device (e.g., the user interface 126). In some embodiments, a static frame of the video content is displayed.

The embodiments of the present disclosure may be applied arbitrarily to other types of digital content for which screenshot protection is desired. This can be accomplished, for example, by converting the digital content into video content that is configured for screenshot-proof display. The video content may be paused during playback, which results in a visual representation of the digital content that is nearly identical to how the digital content would have been displayed in its original format. Alternatively, a static image of the video content may be displayed without causing playback of the video content.

FIG. 4 is a flow diagram illustrating a method 400 of screenshot-proof display of text data in accordance with an embodiment of the present disclosure. The method 400, for example, may be executed as part of block 230 of the method 200, or as part of block 320 of the method 300.

At block 410, the text data of the digital content is converted into an image of text by rendering the text data as an image. In some embodiments, the text data may be converted into an image of text, for example, using one of the APIs available to iOS, including, but not limited to:

[NSString drawInRect:withAttributes:];
[UIView drawViewHierarchyInRect:afterScreenUpdates:]; and
[CALayer renderInContext:].

At block 420, the image of text is converted into video content in a content-protected format, for example, by generating video content for which the image of text is included as a frame of video. In some embodiments, the image of text may be converted, for example, using one of the APIs available to iOS, including, but not limited to, the AVAssetWriter, VideoToolbox, and AVFoundation APIs. In some embodiments, the image may be converted to video content without storing the image or video data to a non-volatile memory storage to provide additional security. Content-protected formatting for video content may be performed as described above with respect to methods 200 or 300.

At block 430, screenshot-proof video display or playback begins, for example, as described with respect to the methods 300 and 400. For example, in some embodiments, a static frame of the video content is displayed. In other embodiments, playback of the video content will begin.

At block 440, which is optional and may be performed in embodiments for which video playback begins, video playback is paused in order to display a static image of the image of text. In some embodiments, to determine when playback begins, the local content client may wait for a callback for when the video player current time changes (which indicates actual playback), or for a callback for when the playback has reached the end (for example, if the video content includes a single video frame). Once either of these callbacks is observed, the video playback will be paused to display the video frame statically.

In one embodiment, the text data may be converted into video content by rendering the text data as one or more frames of the video content. In one embodiment, the text data may be rendered into multiple images of text that are converted into different frames of the video content. The frames of rendered text may be viewed sequentially, for example, by selecting specific frames to display statically or by frame-by-frame scrubbing during playback. In another embodiment, text data may be rendered into a video frame having a resolution that exceeds the display resolution of the user device. The rendered text may be viewable by panning the video player across the screen.

In embodiments for which the initial digital content is image data (e.g., a bitmap image, a JPEG image, or other suitable image file) that is to be screenshot-protected, the method 400 may be modified such that block 410 is omitted. The image data may be processed in a similar manner as described with respect to the rendered text.

FIG. 5 illustrates the effect of performing a screenshot operation on screenshot-proof video content in accordance with an embodiment of the present disclosure. A user device 500 (which may be the same or similar to the user device 120) includes a display area 510 for visually displaying content. A first layer containing background content 520 and a second laying containing screenshot-proof video content 530 are shown in an exploded view to illustrate the hierarchy in which the layers are presented in the display area 510. For example, during display of a video frame or playback of the video, the video content 530 will completely obscure the background content 520 because it spans the entirety of the display area 510. In some embodiments, additional layers will be included. In some embodiments, one or more of the layers will span a portion of the entire display area 510, or may have certain regions that are masked, which results in an underlying layer being visible in the masked regions. When a screenshot operation is performed, the resulting screenshot image 540 will capture all content in the display area 510 except for the screenshot-proof video content 530. The resulting screenshot image 540, as illustrated, will therefore be an image of the background content 520.

In embodiments where the screenshot-proof video content is not included in screenshots, content (which is not configured for screenshot-proof display) that is placed directly behind the video content may appear in screenshots. In some embodiments, the background content 520 may be placed behind the video content 530 only during playback of the video content 530 such that the background content 520 is not be visible to the user unless the user attempts to perform a screenshot operation. This allows for specific content to be displayed within screenshots, which may include, for example, a message reminding users that they should not be taking screenshots or that the video content 530 that the user intended to capture is screenshot-protected. In other embodiments, none of the content of the display area 510, including underlying or overlying content that is not configured for screenshot-proof display, will be captured (e.g., resulting in a blank screenshot image).

In some embodiments, additional screenshot-proof layers may be presented in the display area 510. This allows for embodiments of a screenshot-proof GUI. Each of the components of the GUI, such as buttons, animations, etc., may be generated as individual layers of screenshot-proof video such that the elements of the GUI are collectively screenshot-proof. Various techniques can be utilized to generate on-screen elements from video content that appear as static, animated, or interactive elements, as would be appreciated by one of ordinary skill in the art.

In some embodiments, to address limitations on video dimensions on video content playback, screenshot-proof images that are larger than the maximum allowable video dimensions may be split up into smaller images, which are encoded into separate videos that are displayed in a side-by-side manner.

Certain embodiments may be utilized in connection with a secure messaging application that allows a user to read a secure message for which portions of the message are obscured by one or more blocking layers that are overlaid onto the message. For example, such messaging applications are disclosed in U.S. Pat. Nos. 9,648,001 and 9,712,512, the disclosures of which are hereby incorporated by reference herein in their entireties. Utilizing screenshot-proof video layers to obscure the message provides additional security by providing the added advantage of screenshot-protection.

FIG. 6 illustrates an exemplary messaging application in accordance with an embodiment of the present disclosure. For example, FIG. 6 shows a background layer 610, a content layer 620, a blocking layer 630, and a mask layer 640. The content layer 620 and the blocking layer 630 are each generated as screenshot-proof video content in accordance with the embodiments described herein. The content layer 620 may have been generated from text data or image data that was converted into video content, which may include a displayed frame of the video content. The blocking layer 630 is a video overlay to cover the content layer 620, and may be, for example, a video frame of a solid color, pattern, or image, which may have been generated locally by the messaging application. The mask layer 640 is a layer that may be generated in real-time by the messaging application, and need not be video content in a content-protected format. The mask layer 640 includes masked regions 642, which are arranged to align with positions of rendered text of the displayed content layer 620. Applying the mask layer to the blocking layer 630 results in a masked blocking layer for which only portions of the blocking layer 630 that overlap with the masked regions 642 are visible. Output 650 corresponds to the display of the masked content layer 620, where the message of the content layer 620 is selectively blocked by the masked blocking layer.

Outputs 660 and 670 correspond to what would be displayed as the user elects to reveal a portion of the message rendered in the content layer 620. The user may "swipe" his/her finger across the display screen, for example, which may result in the messaging app updating the mask layer 640 in real-time to reveal previously obscured portion of the content layer 620. In some embodiments, once the user begins to reveal the next line of obscured text, as shown by output 680, the mask layer 640 may be updated to obscure the previous line of the revealed text. In some embodiments, once the entire message is revealed, the mask layer 640 may revert back to obscuring all of the text of the content layer 620, as shown by output 690. In some embodiments, and additional blocking layer (e.g., of a different color, pattern, or image) and an additional mask layer may be utilized to indicate text from the content layer that has already been viewed.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

Figure 7:
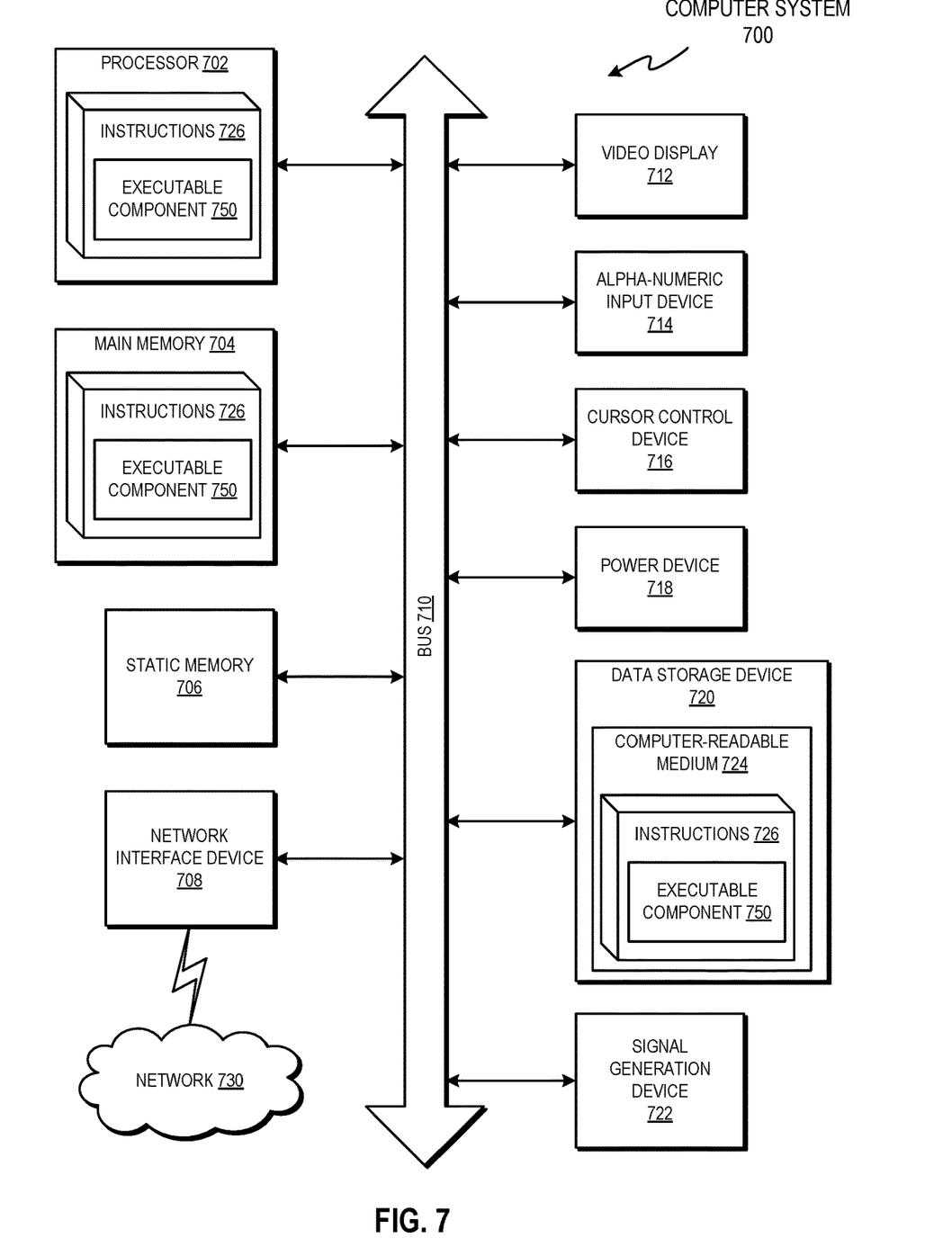
FIG. 7 is a block diagram illustrating an exemplary computer system in accordance with an embodiment of the present disclosure.

FIG. 7 illustrates a diagrammatic representation of a machine in the exemplary form of a computer system 700 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 700 may be utilized by or illustrative of any of the devices of the system architecture 100, such as the data store 110, one or more of the user devices 120A-120Z, and the content server 130.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 720, which communicate with each other via a bus 710.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an ASIC, a field programmable gate array (FPGA), a digital signal processor (DSP), network processor, or the like. The processor 702 is configured to execute instructions 726 for performing the operations and steps discussed herein.

The computer system 700 may further include a network interface device 708. The computer system 700 also may include a video display unit 712 (e.g., a liquid crystal display (LCD), a cathode ray tube (CRT), or a touch screen), an alphanumeric input device 714 (e.g., a keyboard), a cursor control device 716 (e.g., a mouse), and a signal generation device 722 (e.g., a speaker).

Power device 718 may monitor a power level of a battery used to power the computer system 700 or one or more of its components. The power device 718 may provide one or more interfaces to provide an indication of a power level, a time window remaining prior to shutdown of computer system 700 or one or more of its components, a power consumption rate, an indicator of whether computer system is utilizing an external power source or battery power, and other power related information. In some embodiments, indications related to the power device 718 may be accessible remotely (e.g., accessible to a remote back-up management module via a network connection). In some embodiments, a battery utilized by the power device 718 may be an uninterruptible power supply (UPS) local to or remote from computer system 700. In such embodiments, the power device 718 may provide information about a power level of the UPS.

The data storage device 720 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 730 (e.g., the network 105) via the network interface device 708.

In one embodiment, the instructions 726 include instructions for an executable component 750, which may be representative of one or more components for performing any of the methods described herein. For example, the executable component 750 may be representative of a component implemented by the user device 120A to implement one or more of the local content server 122A or the local content client 124A and their respective functionalities. While the computer-readable storage medium 724 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "configuring," "receiving," "converting," "causing," "streaming," "applying," "masking," "displaying," "retrieving," "transmitting," "computing," "generating," "adding," "subtracting," "multiplying," "dividing," "selecting," "parsing," "optimizing," "calibrating," "detecting," "storing," "performing," "analyzing," "determining," "enabling," "identifying," "modifying," "transforming," "aggregating," "extracting," "running," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment. Moreover, it is noted that the "A-Z" notation used in reference to certain elements of the drawings is not intended to be limiting to a particular number of elements. Thus, "A-Z" is to be construed as having one or more of the element present in a particular embodiment.

The present disclosure is not to be limited in scope by the specific embodiments described herein. Indeed, other various embodiments of and modifications to the present disclosure, in addition to those described herein, will be apparent to those of ordinary skill in the art from the description and accompanying drawings. Thus, such other embodiments and modifications are intended to fall within the scope of the present disclosure. Further, while the present disclosure has been described in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method of protecting digital content displayed on a user device, the method comprising:
configuring the user device to host a local content server and a local content client;
receiving, by the user device, the digital content;
converting an original format of the digital content into a content-protected format;
streaming the digital content in the content-protected format from the local content server to the local content client, wherein the digital content is prevented from display by the user device prior to the streaming; and
causing, by the local content client, the user device to display the digital content, wherein the digital content is protected from a screen capture operation executed on the user device based on the content-protected format of the digital content.

2. The method of claim 1, wherein the user device is configured to run an iOS operating system, and wherein the content-protected format is compatible with the FairPlay Streaming protocol.

3. The method of claim 1, wherein the local content server is an HTTP server.

4. The method of claim 1, further comprising:
receiving, by the user device, a command to execute a screen capture while the digital content is displayed by the user device; and
generating, by the user device, a screen capture image that is absent of the digital content.

5. The method of claim 1, wherein:
the digital content comprises video content, and wherein converting the original format of the digital content into the content-protected format further comprises generating a video playlist that flags the video content as being content protected, and
streaming the digital content to the local content client further comprises transmitting the video playlist from the local content server to the local content client.

6. The method of claim 1, wherein the digital content comprises text data or image data, and wherein converting the original format of the digital content into the content-protected format comprises converting the text data or image data into a video content by rendering the text data or image data as one or more frames of the video content.

7. The method of claim 6, further comprising:
causing the user device to display a frame of the video content;
generating a blocking layer for displaying over the displayed frame, the blocking layer comprising additional video content received from the local content server in the content-protected format;
generating a mask layer to mask the blocking layer, wherein the mask layer comprises masked regions arranged to align with positions of rendered text of the displayed frame;
applying the mask layer to the blocking layer to generate a masked blocking layer; and
causing the user device to display the masked blocking layer as an overlay on the displayed frame to selectively block the rendered text from appearing.

8. A system for protecting digital content displayed on a user device, the system comprising:
a processing device; and
a memory operatively coupled to the processing device, wherein the processing device is configured to:
run a local content server and a local content client on the user device;
receive the digital content for storage in the memory;
convert an original format of the digital content into a content-protected format;
stream the digital content in the content-protected format from the local content server to the local content client, wherein the digital content is prevented from display by the user device prior to the streaming; and cause, by the local content client, the user device to display the digital content, wherein the digital content is protected from a screen capture operation executed on the user device based on the content-protected format of the digital content.

9. The system of claim 8, wherein the user device is configured to run an iOS operating system, and wherein the content-protected format is compatible with the FairPlay Streaming protocol.

10. The system of claim 8, wherein the local content server is an HTTP server.

11. The system of claim 8, wherein the processing device is further configured to:

receive a command to execute a screen capture while the digital content is displayed by the user device; and generate a screen capture image that is absent of the digital content.

12. The system of claim 8, wherein:

the digital content comprises video content, and wherein converting the original format of the digital content into the content-protected format further comprises generating a video playlist that flags the video content as being content protected, and streaming the digital content to the local content client further comprises transmitting the video playlist from the local content server to the local content client.

13. The system of claim 8, wherein the digital content comprises text data or image data, and wherein converting the original format of the digital content into the content-protected format comprises converting the text data or image data into a video content by rendering the text data or image data as one or more frames of the video content.

14. The system of claim 13, wherein the processing device is further configured to:

cause the user device to display a frame of the video content;

generate a blocking layer for displaying over the displayed frame, the blocking layer comprising additional video content received from the local content server in the content-protected format;

generate a mask layer to mask the blocking layer, wherein the mask layer comprises masked regions arranged to align with positions of rendered text of the displayed frame;

apply the mask layer to the blocking layer to generate a masked blocking layer; and cause the user device to display the masked blocking layer as an overlay on the displayed frame to selectively block the rendered text from appearing.

15. A non-transitory computer-readable medium having instructions encoded thereon, that, when executed by a processing device of a user device, cause the processing device to:

configure the user device to run a local content server and a local content client;

receive digital content;

convert an original format of the digital content into a content-protected format;

stream the digital content in the content-protected format from the local content server to the local content client, wherein the digital content is prevented from display by the user device prior to the streaming; and cause, by the local content client, the user device to display the digital content, wherein the digital content is protected from a screen capture operation executed on the user device based on the content-protected format of the digital content.

16. The non-transitory computer-readable medium of claim 15, wherein the user device is configured to run an iOS operating system, and wherein the content-protected format is compatible with the FairPlay Streaming protocol.

17. The non-transitory computer-readable medium of claim 15, wherein the local content server is an HTTP server.

18. The non-transitory computer-readable medium of claim 15, wherein:

the digital content comprises video content, and wherein converting the original format of the digital content into the content-protected format further comprises generating a video playlist that flags the video content as being content protected, and streaming the digital content to the local content client further comprises transmitting the video playlist from the local content server to the local content client.

19. The non-transitory computer-readable medium of claim 15, wherein the digital content comprises text data or image data, and wherein converting the original format of the digital content into the content-protected format comprises converting the text data or image data into a video content by rendering the text data or image data as one or more frames of the video content.

20. The non-transitory computer-readable medium of claim 19, wherein the instructions further cause the processing device to:

cause the user device to display a frame of the video content;

generate a blocking layer for displaying over the displayed frame, the blocking layer comprising additional video content received from the local content server in the content-protected format;

generate a mask layer to mask the blocking layer, wherein the mask layer comprises masked regions arranged to align with positions of rendered text of the displayed frame;

apply the mask layer to the blocking layer to generate a masked blocking layer; and cause the user device to display the masked blocking layer as an overlay on the displayed frame to selectively block the rendered text from appearing.

* * * * *